US010644546B2

(12) United States Patent
Billet et al.

(10) Patent No.: US 10,644,546 B2
(45) Date of Patent: May 5, 2020

(54) COMPACT MOTOREDUCER

(71) Applicant: MMT SA, Zug (CH)

(72) Inventors: Lionel Billet, Dannemarie sur Crete (FR); Gaël Andrieux, Evilard (CH)

(73) Assignee: MMT SA, Zug (CH)

( * ) Notice: Subject to any disclaimer, the term of this patent is extended or adjusted under 35 U.S.C. 154(b) by 30 days.

(21) Appl. No.: 15/746,607

(22) PCT Filed: Jul. 25, 2016

(86) PCT No.: PCT/EP2016/067631
§ 371 (c)(1),
(2) Date: Jan. 22, 2018

(87) PCT Pub. No.: WO2017/013266
PCT Pub. Date: Jan. 26, 2017

(65) Prior Publication Data
US 2018/0219435 A1    Aug. 2, 2018

(30) Foreign Application Priority Data
Jul. 23, 2015  (FR) ...................................... 15 57015

(51) Int. Cl.
*H02K 1/14* (2006.01)
*H02K 1/18* (2006.01)
(Continued)

(52) U.S. Cl.
CPC .................. *H02K 1/14* (2013.01); *H02K 1/18* (2013.01); *H02K 7/116* (2013.01)

(58) Field of Classification Search
CPC ............. H02K 1/14; H02K 1/18; H02K 7/116
(Continued)

(56) References Cited

U.S. PATENT DOCUMENTS 2,908,180 A * 10/1959 Swenson ................... F16H 1/20
74/421 A
4,104,859 A * 8/1978 Ogihara ................. G04B 13/00
310/37
(Continued)

FOREIGN PATENT DOCUMENTS

CN         2335297 Y     8/1999
CN       201478933 U     5/2010
(Continued)

*Primary Examiner* — John K Kim
(74) *Attorney, Agent, or Firm* — Harness, Dickey & Pierce, PLC

(57) ABSTRACT

The disclosure relates to a motoreducer consisting of a casing including a brushless motor having at least two electrical phases, a rotor rotating on an axle, and composed of a stator assembly having at least two poles each bearing coils the winding axes of which are spaced apart by a mechanical angle smaller than 180° and extend radially, and a gear train. The gear train includes: a first axle placed in the angular space formed between the two poles, the first axle bearing a first assembly formed by a coupled pinion and toothed wheel, the toothed wheel being placed above the pinion and having a radius larger than the pinion, the toothed wheel meshing with an input pinion rotating on the axle of the rotor, the toothed wheel being placed above the poles bearing the coils, all the axles of the gear train being parallel to one another and parallel to the axle of the rotor. The gear train has at least one axle bearing two toothed wheels/pinion assemblies rotating on the axle.

20 Claims, 7 Drawing Sheets

(51) Int. Cl.
*H02K 7/11* (2006.01)
*H02K 7/116* (2006.01)

(58) Field of Classification Search
USPC .................................................. 310/83, 257
See application file for complete search history.

(56) References Cited

U.S. PATENT DOCUMENTS

| | | | |
|---|---|---|---|
| 5,038,629 A * | 8/1991 | Takimoto | F16H 1/20 |
| | | | 74/421 A |
| 5,880,551 A * | 3/1999 | Prudham | G01R 7/06 |
| | | | 310/156.43 |
| 5,945,750 A * | 8/1999 | Sauter | G01R 7/06 |
| | | | 310/156.08 |
| 6,601,467 B1 * | 8/2003 | Futterer | F16H 1/20 |
| | | | 74/413 |
| 6,670,731 B2 | 12/2003 | Kotani et al. | |
| 6,680,597 B1 | 1/2004 | Catellani et al. | |
| 6,857,338 B2 * | 2/2005 | Tsergas | F16H 57/028 |
| | | | 74/421 A |
| 8,339,003 B2 * | 12/2012 | Prudham | H02K 1/146 |
| | | | 310/216.072 |
| 8,403,376 B2 | 3/2013 | Greiner et al. | |
| 9,529,330 B2 * | 12/2016 | Fukushima | G04C 3/14 |
| 2005/0218727 A1 | 10/2005 | Gandel et al. | |
| 2007/0132422 A1 | 6/2007 | Rondot et al. | |
| 2008/0314164 A1 | 12/2008 | Masson et al. | |
| 2010/0194385 A1 | 8/2010 | Ronnat et al. | |
| 2011/0031824 A1 * | 2/2011 | Prudham | H02K 1/146 |
| | | | 310/48 |
| 2012/0104905 A1 | 5/2012 | Prudham et al. | |
| 2012/0318081 A1 * | 12/2012 | Fukuda | G01D 11/10 |
| | | | 74/89 |
| 2013/0169270 A1 | 7/2013 | Delbaere et al. | |
| 2014/0283732 A1 | 9/2014 | Heinrich | |
| 2015/0123651 A1 | 5/2015 | Biwersi et al. | |
| 2015/0137639 A1 * | 5/2015 | Gomyo | H02K 3/522 |
| | | | 310/71 |
| 2015/0263572 A1 | 9/2015 | Hyppias et al. | |
| 2017/0085203 A1 | 3/2017 | Andrieux et al. | |
| 2017/0373555 A1 | 12/2017 | Sigg et al. | |
| 2018/0219435 A1 * | 8/2018 | Billet | H02K 1/14 |

FOREIGN PATENT DOCUMENTS

DE 4342185 A1 6/1995
JP S6315148 U 1/1988

* cited by examiner

COMPACT MOTOREDUCER

CROSS REFERENCE TO RELATED APPLICATIONS

This application is a National Phase Entry of International Patent Application No. PCT/EP2016/067631, filed on Jul. 25, 2016, which claims priority to French Patent Application Serial No. 1557015, filed on Jul. 23, 2015, both of which are incorporated by reference herein.

TECHNICAL FIELD

The invention relates to the field of motoreducers comprising an electric motor of the brushless type, associated with a speed reduction gear train. Specifically, it relates to a very compact solution using the clever combination of a brushless electric motor with a compact gear train. As non-restricting examples, the invention is intended to be used to actuate automotive thermal control valve flaps, or still to actuate fluid (air, water, fuel . . . ) circulation control assemblies.

BACKGROUND

The Chinese utility model application CN201478933 is known in the prior art, which describes a permanent magnet micromotor, comprising a casing formed by a base and a cover forming a shell internally provided with a Y-shaped stator iron core. The motor comprises a rotor with a permanent magnet, an intermediate shaft parallel to the rotor shaft and an output shaft with an end extending out of the casing. The stator iron core has three teeth with a 60 degrees tooth pitch, with two long teeth surrounded by a coil and a short tooth in the middle.

The European patent application EP1244200 is also known, which describes a stepping motor comprising a rotor having a plurality of magnetic poles along the circumferential direction thereof, a pair of magnetic yokes arranged to face the magnetic poles of the rotor, a pair of field coils for exciting the pair of magnetic yokes, respectively, in response to driving pulses having a phase difference, characterized in that: the stator base is placed close to the rotor, the pair of magnetic yokes are adjusted on the stator base, so that the magnetic paths can be formed respectively, and a pair of pole magnetic stators of the portions formed integrally with the stator base form the magnetic paths as well as the magnetic yokes, respectively.

The Chinese utility model application CN2335297 describes an electric motor which is composed of a driving part, an orientation part and a speed reduction portion. The pole pieces of a stator of the driving part are designed in asymmetrical circular arcs, convex grooves and concave grooves, which can create non-uniform air gaps and can change the magnetic field distribution condition. The orientation part and the speed reduction part have the advantage of a compact and reasonable structure. The utility model can enhance the starting performance and the output torque of miniature motors, can reduce noise and can reduce the additional partial volume.

The document EP0371690 discloses, for example, a transmission mechanism wherein the reduction mechanical assembly is placed at the end of the output axle of the electric motor. Producing mechanical reduction systems with compact gears such as described in the document DE4342185, for instance, is also known. More recently, associating brushless electric motors with such compact reduction systems as described for example in the U.S. Pat. No. 8,403,376 is also known. Associating brushless motors with compact spur-gear reduction systems as described in the patent EP1194999 is also known.

Such devices of the prior art aim at solving the general problem of having a relatively compact mechanical reduction assembly. However, such devices do not make it possible to obtain a very good compactness, or a sufficiently compact motoreducer assembly in specific applications. Particularly for the actuation of a thermal control flap in a motor vehicle, the market demands always more numerous and smaller motoreducer assemblies resulting in a reduced imprint as compared to the current state of the art.

The solutions of the state of the art which use compact reducers having at least two toothed wheel/pinion assemblies per load bearing axle thus do not make it possible to meet the demands imposed in such type of applications, in which a better integration between the motor and the reducer has to be provided, specifically by integrating such elements into a single relatively flat and narrow casing as compared to the existing solutions. The current integrated solutions do not provide for the use of compact enough reduction assemblies.

SUMMARY

The present invention aims at remedying the disadvantages of the prior art by providing a motoreducer cleverly combining a brushless electric motor and a motion reduction gear assembly. For this purpose, the present invention proposes to strengthen the symbiosis between the brushless electric motor and the reduction assembly by placing the first axle bearing a first pinion/toothed wheel assembly between two electric coils carried by the stator of the electric motor. The toothed wheel is thus positioned as close as possible to the motor axis and the motoreducer assembly formed is thus very compact and much more compact than the solutions of the prior art, specifically since two toothed wheel/pinion assemblies are grouped on a single common axle. Such a construction goes against all the solutions proposed in the prior art.

More particularly, the invention provides a motoreducer formed by a casing comprising a brushless motor having at least two electrical phases, a rotor rotating on an axle, and composed of a stator assembly having at least two poles each bearing coils, the winding axes of which are spaced apart by a mechanical angle smaller than 180° and extend radially, and a gear train, the gear train comprising:
 a first axle placed in the angular space formed between the two poles, with said first axle bearing a first assembly formed by coupled pinion (Pe1, Pe1$h$) and toothed wheel (Re1, Re1$h$), with the toothed wheel Re1, Re1$h$ being placed above the pinion (Pe1, Pe1$h$) and having a radius larger than the pinion (Pe1, Pe1$h$),
 with the toothed wheel Re1, Re1$h$ meshing with an input pinion rotating on the axle of the rotor, with the toothed wheel Re1, Re1$h$ being placed above said poles bearing the coils,
 all the axles of the gear train being parallel to one another and parallel to the axle of the rotor characterized in that the gear train has at least one axle bearing two toothed wheel/pinion assemblies rotating on said axle.

Thus, the motoreducer is particularly compact with standard reduction ratios above 1:200. In one embodiment, the electric motor is a two-phase motor and comprises two coils, the winding axes of which are spaced apart by an angle of about 90°. In another embodiment, the electric motor is a three-phase motor and has three coils, the winding axes of which are spaced apart by an angle of about 120°. In another embodiment, the electric motor is a three-phase motor and comprises three coils, the winding axes of which are spaced apart by an angle of about 60°.

The first axle advantageously bears two toothed wheel/pinion assemblies, with the toothed wheels of each assembly being placed above the coils. According to one particular embodiment, the gear train has at least four reduction stages, with a second axle bearing a second and a third, respectively upper and lower, pinion/toothed wheel assemblies, free in relative rotation, with said second upper assembly being formed by a wheel Re2$h$ and a pinion Pe2$h$, with said third lower assembly being formed by a wheel Re2$b$ and a pinion Pe2$b$, the gear train comprises a third axle bearing a fourth assembly formed by a wheel Re3H and a pinion Pe3$h$, and with said wheel Re2$h$ meshing with the pinion Pe1 of said first assembly, with said pinion Pe2$h$ meshing with said wheel Re3$h$ of said fourth assembly, with said pinion Pe3$h$ meshing with the wheel Re2$b$ of said third assembly. According to another particular embodiment, such gear train has at least four reduction stages, the first axle comprises a second toothed wheel/pinion assembly formed by a wheel Re1$b$ and a pinion Pe1$b$, the gear train comprises a second axle bearing: a third assembly formed by a wheel Re2$h$ and a pinion Pe2$h$ and a fourth assembly formed by a wheel Re2$b$ and a pinion Pe2$b$, and with said wheel Re2$h$ meshing with the pinion Pe1$h$ of said first assembly, with said pinion Pe2$h$ meshing with said wheel Re1$b$ of said second assembly, with said pinion Pe1$b$ meshing with the wheel Re2$b$ of said fourth assembly.

In an alternative embodiment, said pinion Pe2$b$ drives the output axle. In one embodiment, said third axle further comprises a wheel Re3$b$ driven by said pinion Pe2$b$, with said wheel Re3$b$ driving an output ring gear RDS surrounding the output axle. In another embodiment, said pinion Pe2$b$ drives an output ring gear RDS surrounding the output axle.

Alternatively, said output ring gear RDS has a through-opening. Advantageously, each of said toothed wheel/pinion assemblies comprises a wheel placed above the pinion. In order to reduce the total imprint of the motoreducer, the first axle is advantageously placed in contact with the stator assembly on its outer circumference.

BRIEF DESCRIPTION OF THE DRAWINGS

Other characteristics and advantages of the invention will appear upon reading the following detailed exemplary embodiments, while referring to the appended figures which respectively show.

DETAILED DESCRIPTION

Figure 1:
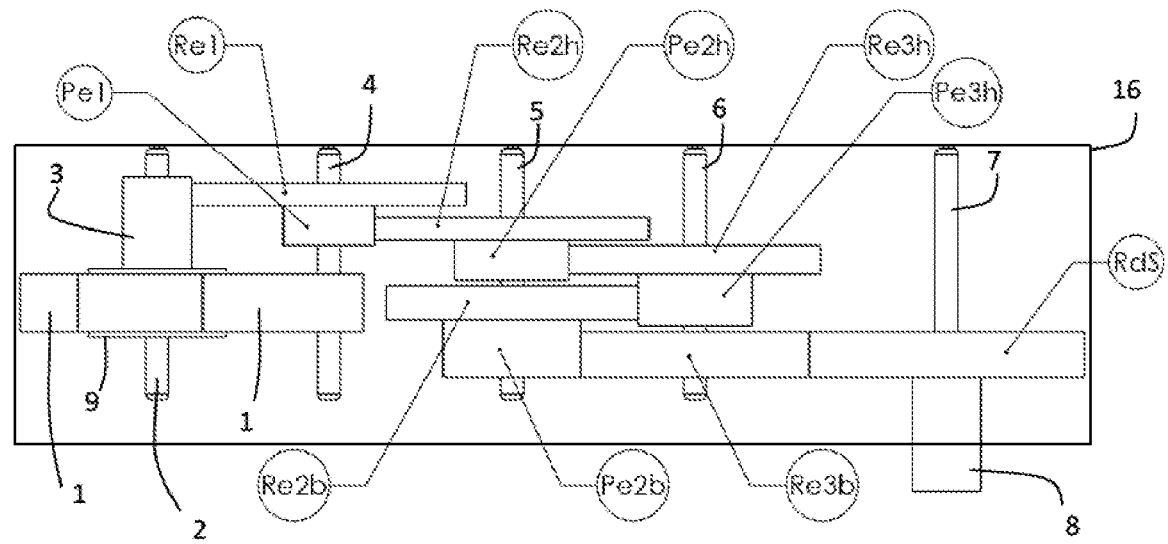
FIG. 1 is a diagrammatic view of a first embodiment of the invention.

FIG. 1 schematically shows a first typical embodiment of the invention. The motoreducer consists of a casing (16) in which an electric motor of the brushless type comprising a wound stator assembly (1) which magnetically cooperates with the rotor (9) formed by one or more pair(s) of magnetic poles is positioned at the motoreducer inlet. The rotor (9) is guided in rotation by an input axle (2) and is extended by an input pinion (3) meshing with a gear train forming a mechanical motion reducer, which reduces the mechanical stroke and multiplies the effort at the train output.

Such gear train is composed of five or six reduction stages (depending on the Re3$b$/RDS connection discussed below) symbolized by pinion/toothed wheel assemblies carried by a first (4), a second (5), and a third (6) stationary axle as well as by an output axle (7). All the axles (4, 5, 6, 7) of said gear train are parallel to each other and parallel to the input axle 2.

The first axle (4) carries a toothed wheel Re1 coupled to a pinion Pe1, with both elements rotating on the first axle (4). The toothed wheel Re1 meshes with the toothed input pinion (3), and thus builds a first reduction stage. Advantageously, the first axle (4) goes through the volume in which the wound stator assembly (1) is inscribed and the toothed wheel Re1 is placed above the wound stator assembly (1).

The second axle (5) carries a toothed wheel Re2$h$ coupled to a pinion Pe2$h$, with both elements rotating on the second axle (5), and a toothed wheel Re2$b$ coupled to a pinion Pe2$b$, with both elements also rotating on the second axle 5. The pinion Pe1 meshes with the toothed wheel Re2$h$, and thus builds a second reduction stage.

The third axle (6) carries a toothed wheel Re3$h$ coupled to a pinion Pe3$h$, with both elements rotating on the third axle (6) and a toothed wheel Re3$b$ also rotating on the third axle (6). The toothed wheel Re3$h$ meshes with the toothed pinion Pe2$h$, and thus builds a third reduction stage, the toothed wheel Re2$b$ meshes with the toothed pinion Pe3$h$, and thus builds a fourth reduction stage, and the toothed wheel Re3$b$ meshes with the toothed pinion Pe2$b$, and thus builds a fifth reduction stage.

The output axle (7) carries a toothed output wheel RDS rotating on the output axle (7). A connecting member (8) makes it possible to couple the toothed output wheel RDS with any external member to be moved (not shown). The toothed wheel Re3$b$ meshes with the toothed output wheel RDS. It should be noted that the latter gear linkage may as well be unitary or not unitary according to a reduction ratio. Such linkage advantageously makes it possible to take advantage of a hollow toothed output wheel RDS which can more easily be connected to an external member. The toothed output wheel RDS can extend outside the casing (16) or be flush therewith, but can also be positioned inside the casing (16). In the latter case, the external member to be coupled penetrates inside the casing (16).

Figure 2A:
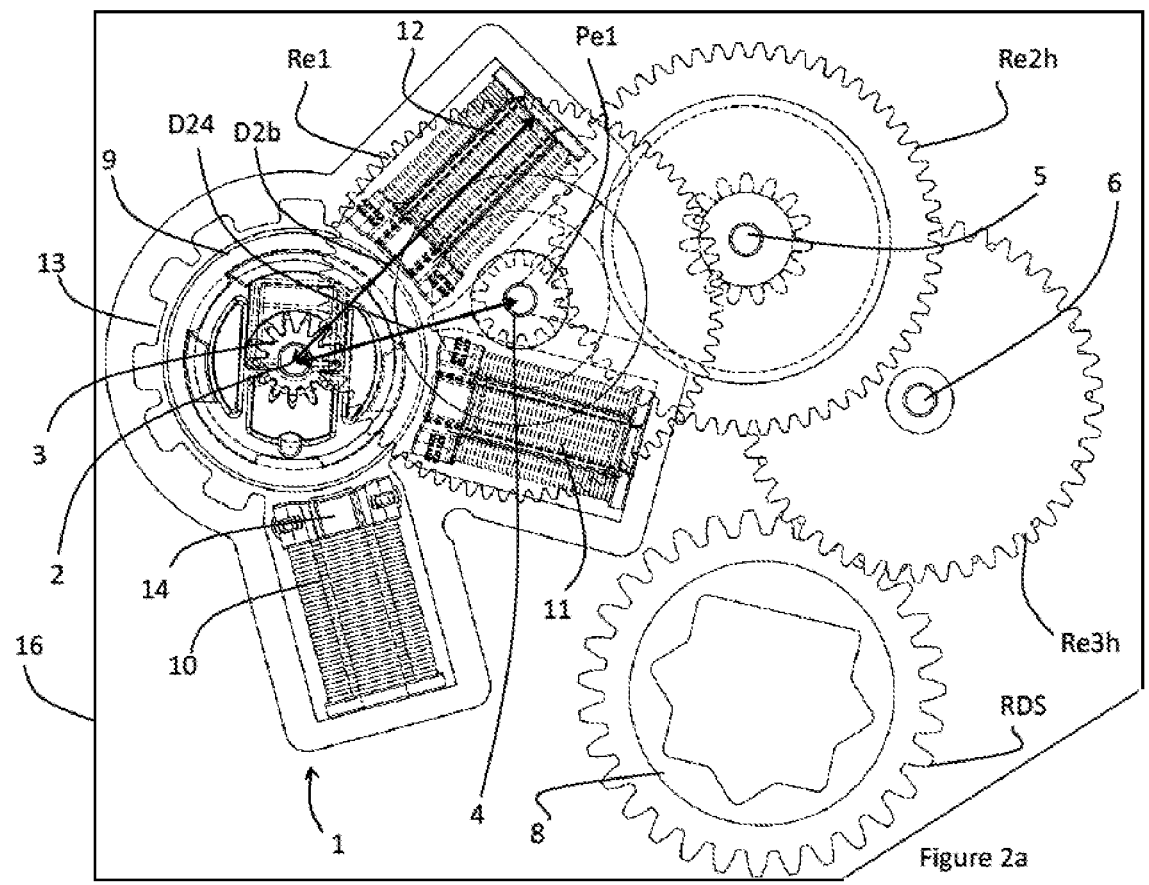
FIGS. 2$a$ and 2$b$ are respectively front and perspective views of a first embodiment according to the first example.
Figure 2B:
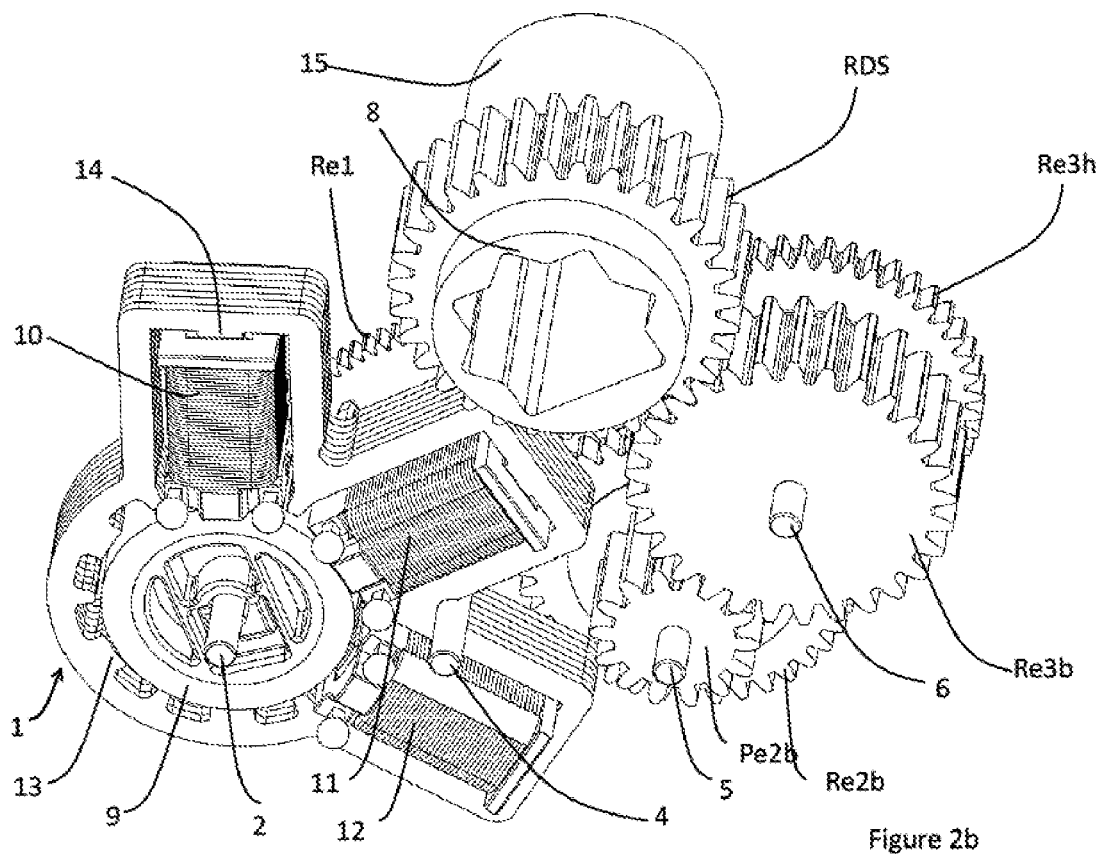

FIGS. 2$a$ and 2$b$ show a first embodiment of a motoreducer according to the first example. It comprises using a three-phase electric motor, having a stator assembly (1) composed of an assembly of plates made of soft ferromagnetic material, for instance iron-silicon and three electric coils (10, 11 and 12) which are carried by poles, for example (14) of the stator assembly 1 and the winding axes of which are spaced apart from each other by approximately 60°. The overall dimensions of the motoreducer, which can be inscribed in a casing (16), the imprint of which can be seen in FIG. 2$a$, is thus minimized because the reduction gear train and the wound poles are on the same side between the axle (2) of the rotor (9) and the output wheel RDS. The casing (16) receiving such motoreducer assembly can thus have a reduced size as compared to the prior art.

Such stator assembly (1) also has several not wound poles, for example (13), which are used to close the magnetic flux of the circuit formed, and to manage the detent torque, as taught by the state of art on the subject. This motor also comprises a rotor 9 having a magnetised ring which rotates on the input axle (2).

The first axle 4 on which the toothed wheel Re1 and pinion Pe1 assembly rotates, is placed between the coils (11) and (12), in contact with the stator assembly (1) on the periphery of the stator assembly. The contact is not absolutely necessary for the invention, but the compactness sought will be even better if the first axle (4) is close to the input axle (2). It is considered, within the meaning of the invention, that the first axle (4) is between the coils (11) and (12) when the coils (11, 12) are spaced apart by a mechanical angle smaller than or equal to 180°, here of about 60° and when the distance D24 from the input axle (2) to the first axle (4) is smaller than the distance D2b from the input axle (2) to the radial end of the coils (11, 12).

All the elements are then described in FIG. 1 including the output wheel RDS which has a connecting member (8) having a shape enabling the coupling thereof to an external device not shown. It should be noted that, in this example, the wheel RDS is not linked to and driven by an output axle (7), unlike what is shown in FIG. 1, but is guided by the shape (15) given to the wheel RDS on one side.

The connecting member is advantageously hollow and through-going, so that the coupling with the external member to be moved can be equally mounted on either side of the motoreducer. This reversible mounting is more particularly possible thanks to the use of the toothed wheel Re3b which meshes with the output toothed wheel RDS according to a unitary or near-unitary reduction ratio, which makes it possible to space the wheel RDS apart from the other gears and enables an easier connection of the external member to be connected.

The compactness of the solution is thus mainly ensured by the reduced spacing between the axle (2) of the rotor 9 and the output connecting member (8) through the clever positioning of the first axle (4) between the coils inside the volume in which the stator assembly is inscribed. Secondly, compactness is provided by using a gear reduction assembly having at least one axle bearing two pinion/toothed wheel assemblies. The reduction ratio that can be achieved is very high, typically above 1:450, with small dimensions.

Figure 3A:
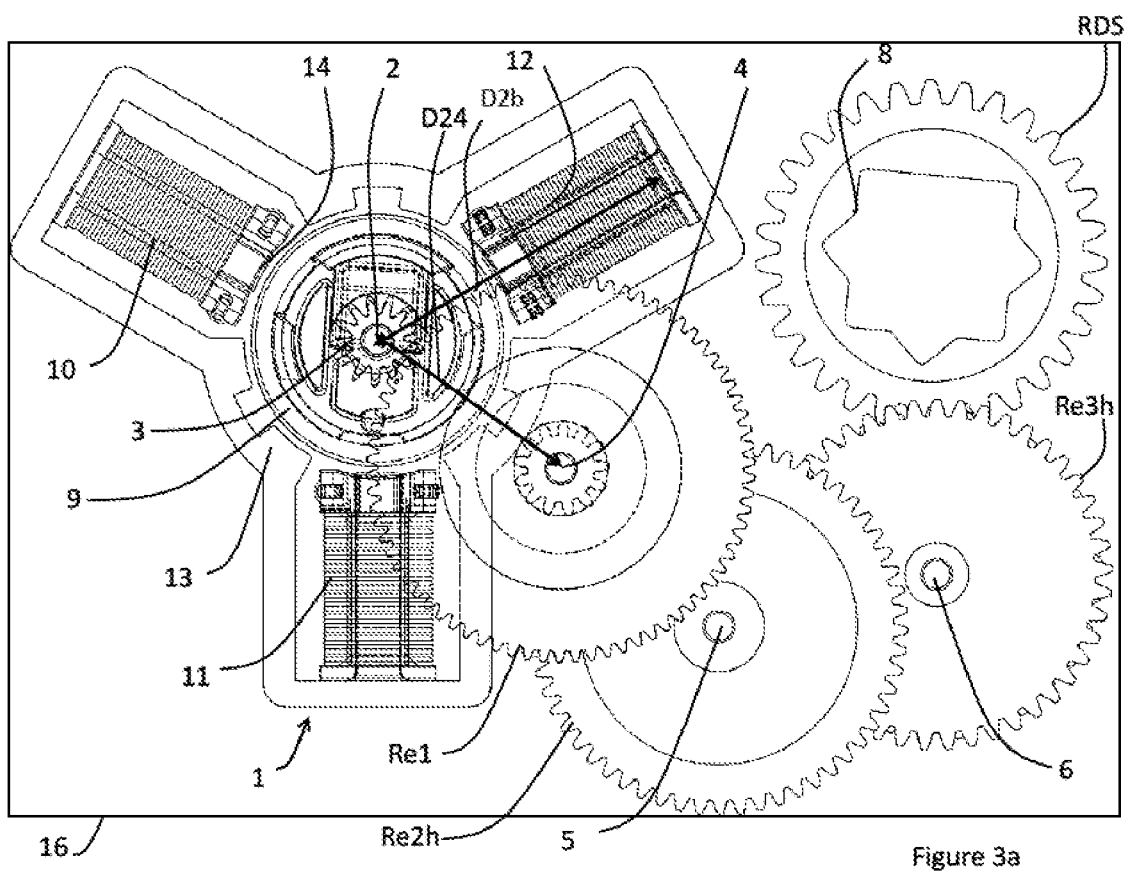
FIGS. 3$a$ and 3$b$ are respectively front and perspective views of a second embodiment according to the first example.
Figure 3B:
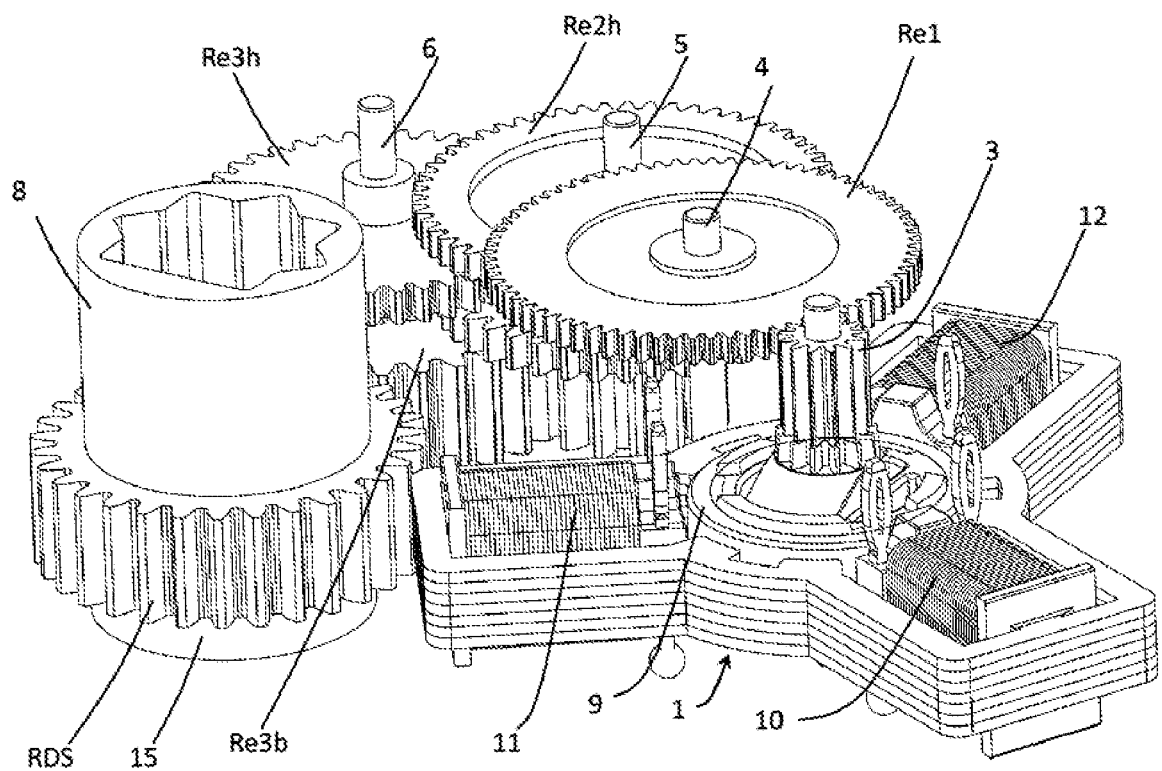

FIGS. 3a and 3b show a second embodiment of a motoreducer according to the first example. It comprises using a three-phase electric motor, having a stator assembly (1) composed of an assembly of plates made of soft ferromagnetic materials, for instance iron-silicon and three electric coils (10), (11) and (12) which are carried by poles, for example (14), of the stator assembly (1) and which are angularly distributed every 120°. Such stator assembly (1) has also several not wound poles, for example (13), which are used to close the magnetic flux of the circuit formed, and to manage the detent torque, as taught by the state of the art on the subject. This motor also comprises a rotor (9) having a magnetised ring rotating on the input axle (2).

The first axle (4) on which the toothed wheel Re1 and pinion Pe1 assembly rotates, is placed between the coils (11) and (12), but without contact with the stator assembly (1). The contact is not absolutely necessary for the invention, but the compactness sought will be even better if the first axle 4 is close to the input axle (2). It is considered, within the meaning of the invention, that the first axle (4) is between the coils (11) and (12) when the coils (11), (12) are spaced apart by a mechanical angle smaller than or equal to 180°, here about 120° and when the distance D24 from the input axle (2) to the first axle (4) is smaller than the distance D2b from the input axle (2) to the radial end of the coils (11, 12).

All the elements are described in FIG. 1 including the output wheel RDS which has a connecting member (8) having a shape enabling the coupling thereof to an external device not shown. It should be noted that, in this example like in that of FIGS. 2a and 2b, the wheel RDS is not linked to and driven by an output axle (7), unlike what is shown in FIG. 1, but is guided by the shape (15) given to the wheel RDS on one side.

The connecting member is advantageously hollow and through-going, so that the coupling with the external member to be moved can be equally mounted on either side of the motoreducer. This reversible mounting is more particularly possible thanks to the use of the toothed wheel Re3b which meshes with the output toothed wheel RDS according to a unitary or near-unitary reduction ratio, which makes it possible to space the wheel RDS apart from the other gears and enables an easier connection of the external member to be connected.

The compactness of the solution is thus mainly ensured by the reduced spacing between the axle (2) of the rotor (9) and the output connecting member (8) through the clever positioning of the first axle (4) between the coils inside the volume in which the stator assembly (1) is inscribed. Secondly, compactness is provided by using a gear reduction assembly having at least one axle bearing two pinion/toothed wheel assemblies. The reduction ratio that can be achieved is very high, typically above 1:450, with small dimensions.

Figure 4:
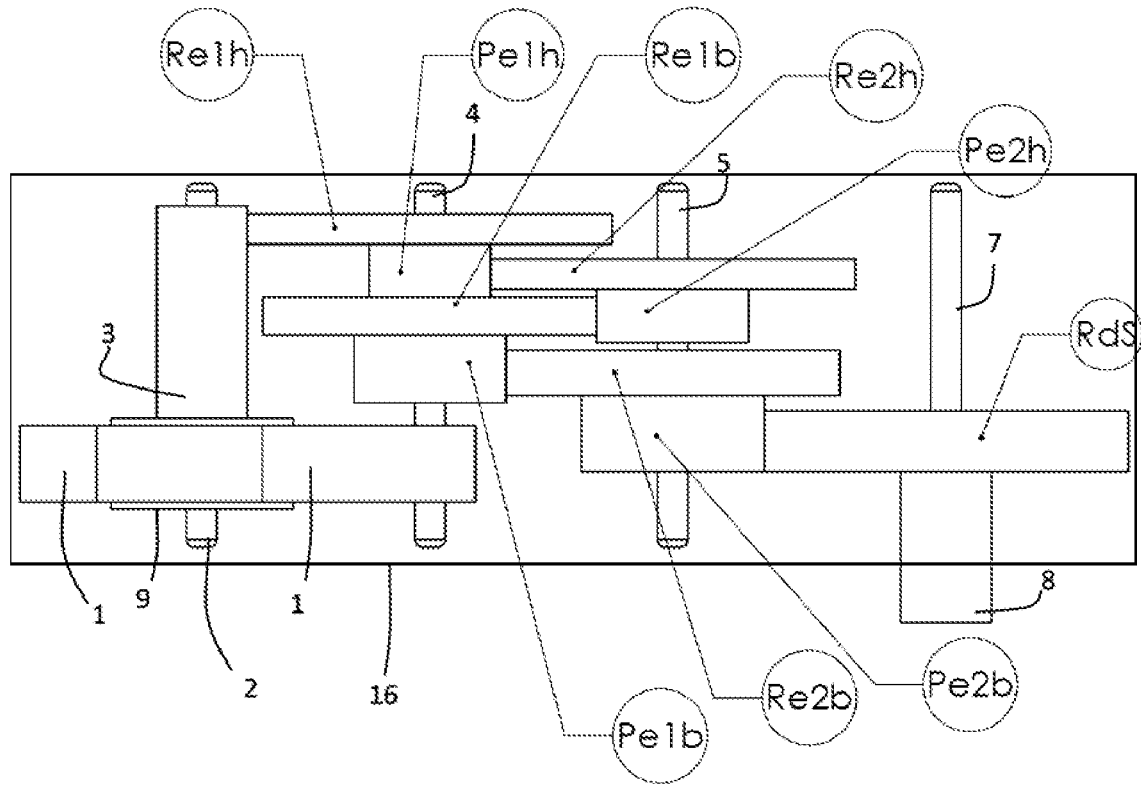
FIG. 4 is a schematic view of a second embodiment of the invention.

FIG. 4 schematically shows a second typical embodiment of the invention. An electric motor of the brushless type comprising a wound stator assembly (1) which magnetically cooperates with a rotor 9 formed by one or more pair(s) of magnetic poles, is positioned at the motoreducer inlet. The rotor (9) is carried by an input axle (2) and is extended by an input pinion (3) meshing with a gear train forming a mechanical motion reducer, which reduces the mechanical stroke and multiplies the effort at the train output.

Unlike the first example, the motion reduction gear train is more compact with one axle carrying a gear less. This gear train is composed of four or five reduction stages (depending on the nature of the Pe2b/RDS connection discussed later) symbolized by pinion/toothed wheel assemblies carried by a first 4 and a second 5 stationary axle as well as by an output axle (7). All the axles (4, 5, 7) of said gear train are parallel to each other and parallel to the input axle (2).

The first axle (4) carries a toothed wheel Re1h coupled to a pinion Pe1h, with both elements rotating on the first axle (4). The toothed wheel Re1h meshes with the toothed input pinion (3), and thus builds a first reduction stage. Advantageously, the first axle (4) goes through the volume in which the wound stator assembly (1) is inscribed and the toothed wheel Re1h is placed above the wound stator assembly (1). This first axle (4) also has a toothed wheel Re1b coupled to a pinion Pe1b, with both elements rotating on the first axle (4).

The second axle (5) carries a toothed wheel Re2h coupled to a pinion Pe2h, with both elements rotating on the second axle (5) and a toothed wheel Re2b coupled to a pinion Pe2b, with both elements also rotating on the second axle (5). The toothed wheel Re2h meshes with the pinion Pe1h, and thus builds a second reduction stage. The toothed wheel Re1b meshes with the toothed pinion Pe2h, and thus builds a third reduction stage, and the toothed wheel Re2b meshes with the toothed pinion Pe1b, and thus builds a fourth reduction stage.

The output axle (7) carries a toothed output wheel RDS rotating on the stationary output axle 7. A connecting member 8 makes it possible to couple the toothed output wheel RDS with any external member to be moved (not shown). The toothed wheel Re2b meshes with the toothed output wheel RDS. It should be noted that this latter gear linkage may as well be unitary or not unitary according to a reduction ratio. If the ratio is unitary, this connection advantageously makes it possible to take advantage of a hollow output toothed wheel RDS which can more easily be connected to an external member.

Figure 5A:
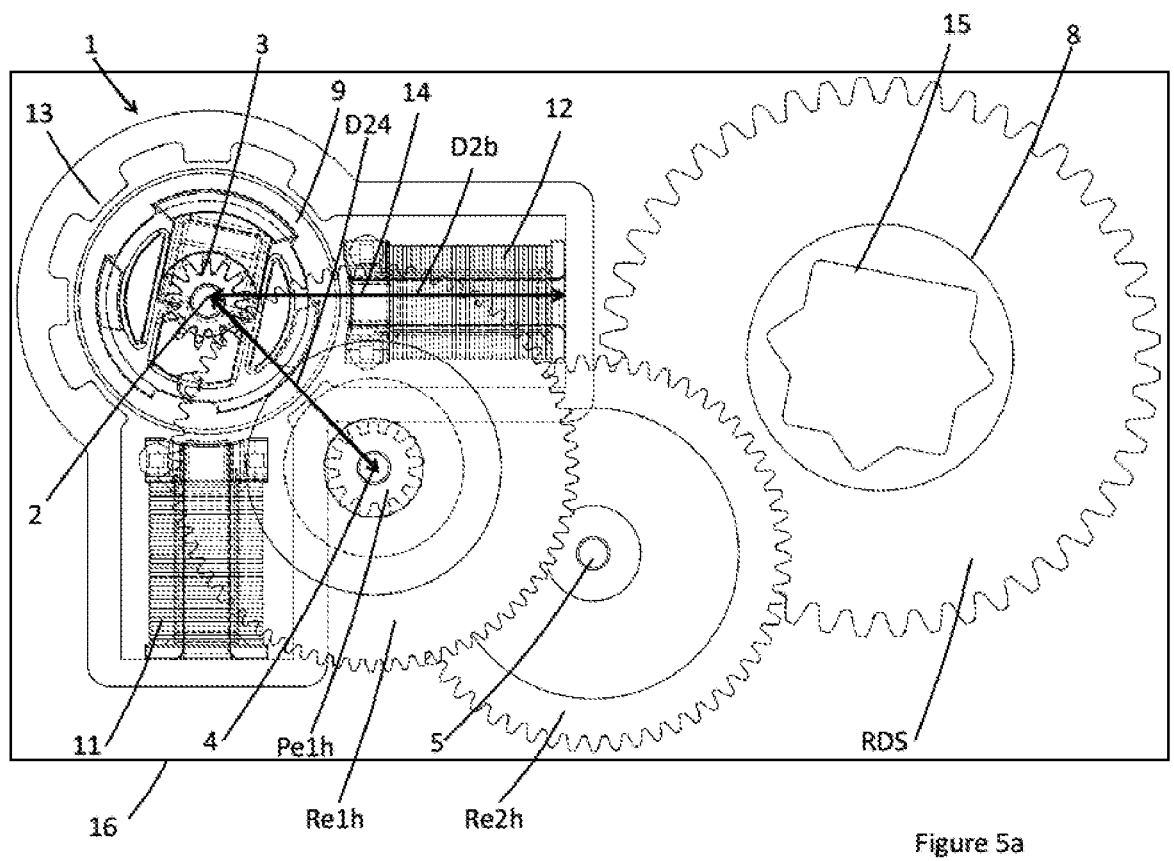
FIGS. 5$a$ and 5$b$ are respectively front and perspective views of one embodiment according to the second example.
Figure 5B:
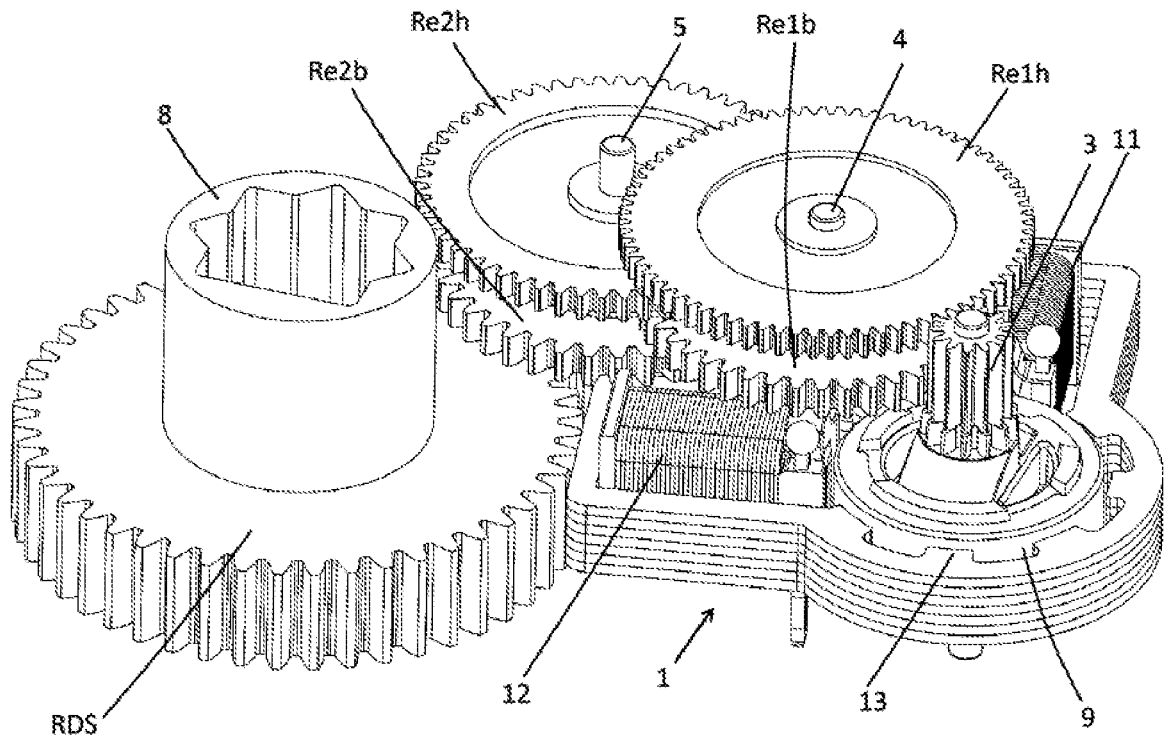

To give a concrete illustration of one embodiment according to this second example, FIGS. 5a and 5b show a motoreducer produced from the exemplary use of a two-phase brushless motor with two coils (11) and (12), which is mechanically and electrically phase-shifted by 90°. The stator assembly (1) is composed of an assembly of plates made of soft ferromagnetic materials, for example iron-silicon and two electric coils 11 and 12 which are carried by poles, for example (14) of the stator assembly (1) and the winding axes of which are spaced apart from each other by about 90°. The overall dimensions of the motoreducer, which can be inscribed in a casing (16), the imprint of which can be inscribed in FIG. 5a, is thus minimized because the reduction gear train and the wound poles are on the same side between the axle (2) of the rotor 9 and the output wheel RDS. The casing (16) receiving such motoreducer assembly can thus have a reduced size as compared to the prior art.

Such stator assembly (1) also has several not wound poles, for example (13), which are used to close the magnetic flux of the circuit formed, and to manage the detent torque, as taught by the state of art on the subject. This motor also comprises a rotor 9 having a magnetised ring which rotates on the input axle (2).

The first axle (4) on which the toothed wheel Re1h and pinion Pe1h assembly rotates, is placed between the coils (11) and (12) in contact with the stator assembly (1). The contact is not absolutely necessary for the invention, but the compactness sought will be even better if the first axle (4) is close to the stator assembly (1). It is considered, within the meaning of the invention, that the first axle (4) is between the coils 11 and 12 when the coils (11, 12) are spaced apart by a mechanical angle smaller than or equal to 180°, here about 90° and when the distance D24 from the input axle (2) to the first axle (4) is smaller than the distance D2b from the input axle (2) to the radial end of the coils (11, 12).

All the elements are then described in FIG. 4 including the output wheel RDS which has a connecting member (8) having a shape enabling the coupling thereof to an external device not shown. The connecting member is advantageously hollow and through-going so that the coupling with the external member to be moved can be equally mounted on either side of the motoreducer.

The compactness of the solution is mainly provided by the reduced spacing between the axle (2) of the rotor 9 and the output connecting member (8) through the clever positioning of the first axle (4) between the coils inside the volume in which the stator assembly is inscribed. Secondly, compactness is provided by using a gear reduction assembly having at least one axle bearing two pinion/toothed wheel assemblies. The reduction ratio that can be achieved in this example is very high, typically above 1:450, with small dimensions.

Figure 6:
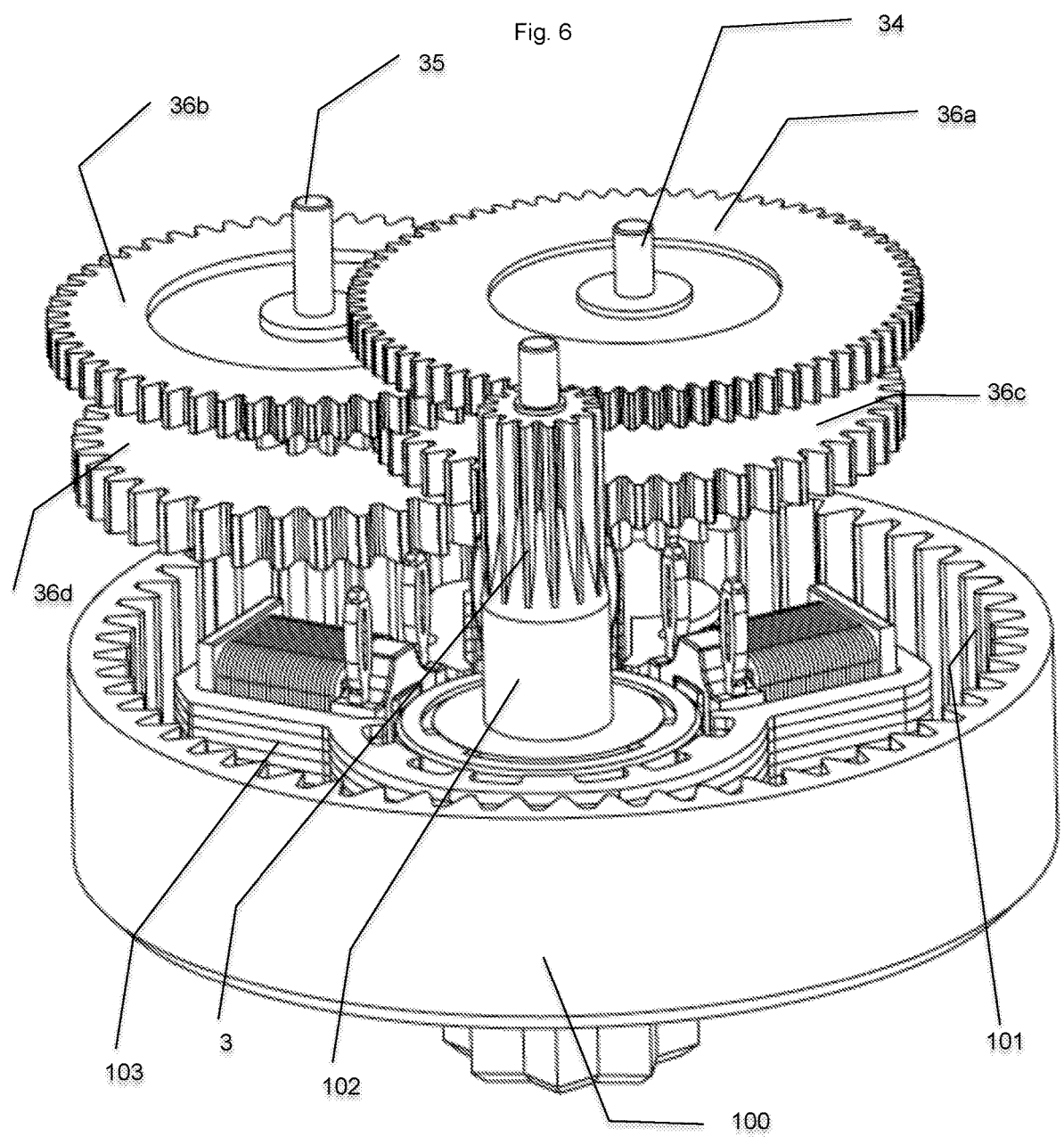
FIGS. 6 to 8 show views of a third embodiment of the invention.
Figure 7:
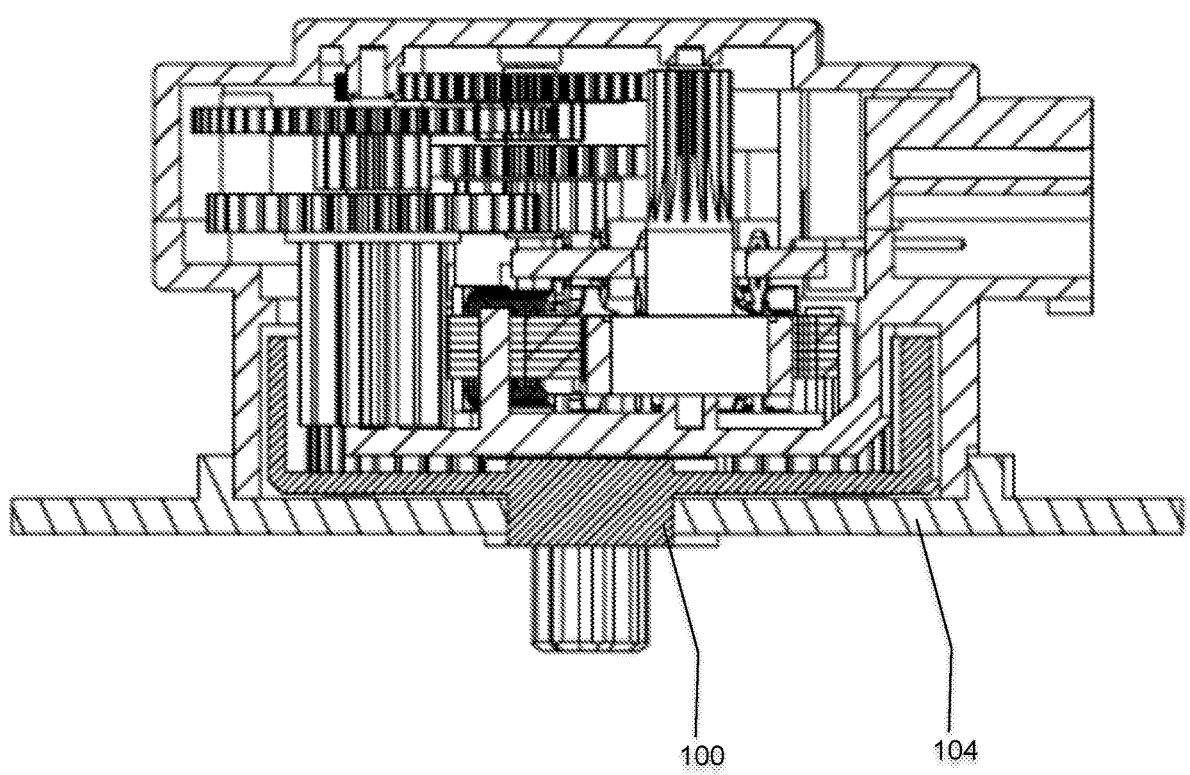
Figure 8:
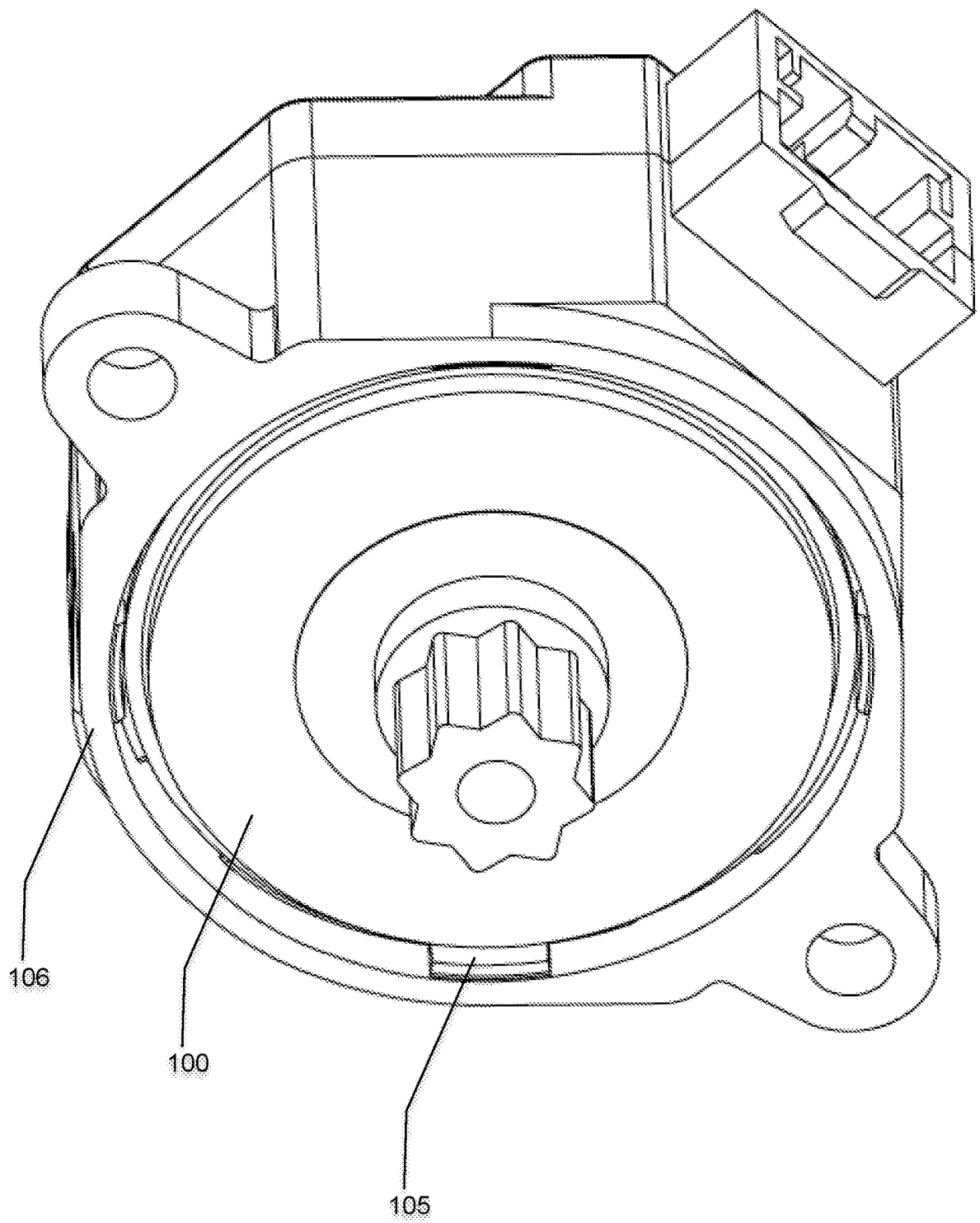

Third exemplary embodiment: FIGS. 6 to 8 illustrate the integration according to the present invention of an electric motor and at least (4) gear stages. According to this alternative solution, the electric motor (103) is accommodated inside the wheel (100) having a cylindrical shape with a toothed inner ring (101).

The rotor (102) is eccentric and drives the input pinion (3) which meshes with the toothed wheel (36a) furthest from the electric motor (103). In the internal cylindrical volume described by the output wheel (100), the out-of-round position of the rotor (102) of the motor (103) meshing with the wheel (101) makes it possible to position at least two axes of rotation (34) and (35) and to leave a maximum surface area to the gears (36a) to (36d). The pinion of the mobile element (36d) meshes with the inner ring (101) surrounding the electric motor (103).

The top stage with internal teeth, thanks to its pitch circle which is larger than an internal gear would make it possible, enables both a significant reduction and high modulus teeth, better than a gear with external teeth would. The top stage is thus capable of transmitting high torques.

FIG. 7 illustrates an actuator according to the previous integration, in which the output wheel (100) is exposed, with such option making it possible to minimize the number of parts required to produce same. This output wheel (100) is free to rotate and is held locally only, using pins or other means to prevent the releasing thereof from the reducer. When using the actuator, an external receiving surface (104) belonging to the system accommodating the actuator closes the reducer and ensures the mechanical holding thereof or provides the tightness thereto.

The closure of the volume surrounding the output wheel is provided directly during the assembly on the application, as well as the guiding thereof. This is illustrated in FIG. 8 showing a perspective view of the actuator. The volume surrounding the rotating output wheel (100) is closed without requiring an additional part of the actuator. A retaining clip 105 is shown, which belongs to the casing (106) of the actuator, and is used to axially lock the output wheel (100).

The invention claimed is:

1. A motoreducer formed by a casing comprising:
   (a) a brushless motor having at least two electrical phases, a rotor rotating on a rotor axle bearing an input pinion that rotates on the rotor axle, and a stator assembly having at least two poles each bearing coils, winding axes of which are spaced apart by a mechanical angle smaller than 180° and extend radially;
   (b) a gear train comprising:
      at least four reduction stages;
      at least three gear axles;
      a first of the gear axles placed in the angle space formed between the two poles, with the first axle bearing a first assembly formed by a coupled pinion and a toothed wheel, with the toothed wheel being placed above the pinion and having a radius larger than the pinion;
      the toothed wheel meshing with the input pinion, the toothed wheel being placed above the poles bearing the coils;
      all of the axles of the gear train being parallel to one another and parallel to the axle of the rotor;
      at least one of the gear axles bearing two toothed wheel/pinion assemblies; and
   (c) the gear train being positioned transversely relative to the input pinion and being positioned on one side of the input pinion.

2. The motoreducer according to claim 1, wherein the motor is a two-phase motor and comprises two coils, the winding axes of which are spaced apart by an angle of about 90°.

3. The motoreducer according to claim 1, wherein the motor is a three-phase motor and comprises three coils, the winding axes of which are spaced apart by an angle of about 120°.

4. The motoreducer according to claim 1, wherein the motor is a three-phase motor and comprises three coils, the winding axes of which are spaced apart by an angle of about 60°.

5. The motoreducer according to claim 1, wherein the first axle bears the two toothed wheel/pinion assemblies, with the toothed wheels of each assembly being placed above the coils.

6. The motoreducer according to claim 1, wherein:
the gear train has at least four reduction stages;
the at least three axles of the gear train comprise a second gear axle bearing a second and a third, respectively upper and lower, pinion/toothed wheel assemblies, free in relative rotation;
the second upper assembly is formed by a wheel and a pinion;
the third lower assembly is formed by a wheel and a pinion;
the at least three axles of the gear train comprises a third gear axle;
a fourth assembly is rotatable on one of the gear axles and is formed by a wheel and a pinion;
the wheel of one of the assemblies meshes with the pinion of the first assembly;
the pinion of one of the assemblies meshes with the wheel of the fourth assembly; and
the pinion of one of the assemblies meshes with the wheel of the third lower assembly.

7. The motoreducer according to claim 1, wherein:
the gear train has at least four reduction stages;
the first gear axle comprises a second pinion/toothed wheel assembly formed by a wheel and a pinion;
the at least three axles of the gear train comprises a second gear axle;
a third assembly is rotatable on one of the gear axles and is formed by a wheel and a pinion;
a fourth assembly is rotatable on one of the gear axles and is formed by a wheel and a pinion;
the wheel of one of the assemblies meshes with the pinion of the first assembly;
the pinion of one of the assemblies meshes with the wheel of the second assembly; and
the pinion of one of the assemblies meshes with the wheel of the fourth assembly.

8. The motoreducer according to claim 7, wherein the pinion of the fourth assembly operably drives an output axle of the multiple gear axles.

9. The motoreducer according to claim 6, wherein the third gear axle further comprises a wheel driven by the pinion of the third lower assembly, with the wheel driving an output ring gear surrounding an output gear axle of the at least three gear axles.

10. The motoreducer according to claim 7, wherein the pinion of one of the assemblies operably drives an output ring gear.

11. The motoreducer according to claim 10, wherein the output ring gear has a through-opening.

12. The motoreducer according to claim 1, wherein each of the toothed wheel/pinion assemblies comprises a wheel placed above the pinion.

13. The motoreducer according to claim 1, wherein the first gear axle is placed in contact with the stator assembly on its outer circumference.

14. The motoreducer according to claim 6, wherein:
a fourth assembly is rotatable on the third gear axle;
the wheel of the second upper assembly meshes with the pinion of the first assembly;
the pinion of the second upper assembly meshes with the wheel of the fourth assembly; and
the pinion of the fourth assembly meshes with the wheel of the third lower assembly.

15. The motoreducer according to claim 7, wherein:
the third assembly is rotatable on the second gear axle
the fourth assembly is rotatable on the second gear axle;
the wheel of the third assembly meshes with the pinion of the first assembly;
the pinion of the third assembly meshes with the wheel of the second assembly; and
the pinion of the second assembly meshes with the wheel of the fourth assembly.

16. The motoreducer according to claim 1, wherein at least two of the gear axles bear two toothed wheel/pinion assemblies.

17. The motoreducer according to claim 1, wherein:
at least one of the gear axles bears two toothed wheel/ pinion assemblies; and
at least one of the gear axles bears a toothed wheel/pinion assembly and a toothed wheel in addition to a toothed wheel included in the toothed wheel/pinion assembly.

18. A motoreducer comprising:
(a) a casing;
(b) a brushless motor having at least two electrical phases, a rotor rotating on a rotor axle, and a stator assembly having at least two poles each bearing coils, winding axes of which are spaced apart by a mechanical angle smaller than 180° and extend radially; and
(c) a gear train comprising:
multiple gear axles;
a first of the gear axles placed in the angle space formed between the two poles, with the first axle bearing a first assembly formed by a coupled pinion and a toothed wheel, with the toothed wheel being placed above the pinion and having a radius larger than the pinion;
the toothed wheel meshing with an input pinion rotating on the axle of the rotor, the toothed wheel being placed above the poles bearing the coils;
all of the axles of the gear train being parallel to one another and parallel to the axle of the rotor; and
at least one of the gear axles rotatably bearing two toothed wheel/pinion assemblies;
(d) wherein the electric motor is accommodated inside an internally toothed gear.

19. The motoreducer according to claim 18, further comprising an external docking surface belonging to the system accommodating the actuator, containing the reducer and: ensuring mechanical holding thereof, or providing sealing thereof.

20. A motoreducer comprising:
(a) a casing;
(b) a brushless motor located within the casing and including at least two electrical phases and comprising a rotor including an axle rotating about a rotor axis and a stator including multiple poles bearing electrical coils, winding axes of which are spaced apart by a mechanical angle smaller than 180° and extend radially, the rotor axle bearing an input pinion adapted to rotate on the rotor axis;

(c) a gear train, located inside the casing, comprising:
- a first axle located between an adjacent pair of the poles, a first pinion and toothed wheel assembly being rotatable about the first axle, and the toothed wheel having a radius larger than the pinion which are coaxial with each other, and the first axle being closer to the rotor axis than are distal radial ends of the coil bearing poles;
- the toothed wheel meshing with the input pinion;
- a second axle offset from the first axle and the rotor axis, at least a second pinion and toothed wheel assembly rotatable on the second axle and including multiple coaxial and spaced apart toothed wheels;
- a third axle offset from the first axle, the second axle, and the rotor axis;
- the gear train having at least four reduction stages;
- all of the axles of the gear train being parallel to one another and parallel to the rotor axis; and
- a toothed wheel of the first assembly overlapping with the coil bearing pair of the poles in a true view.

* * * * *